United States Patent Office 3,514,855
Patented June 2, 1970

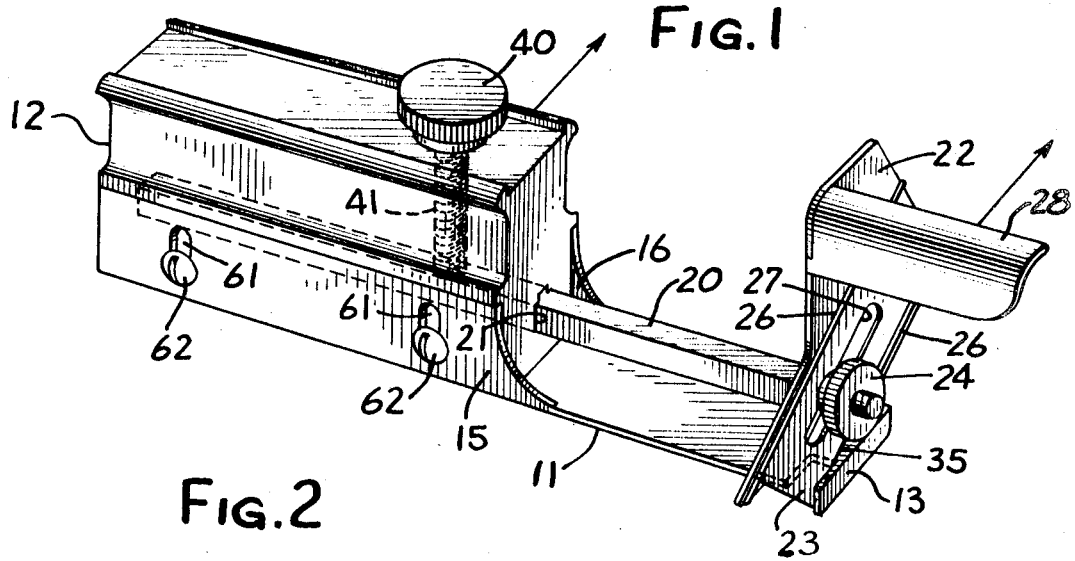
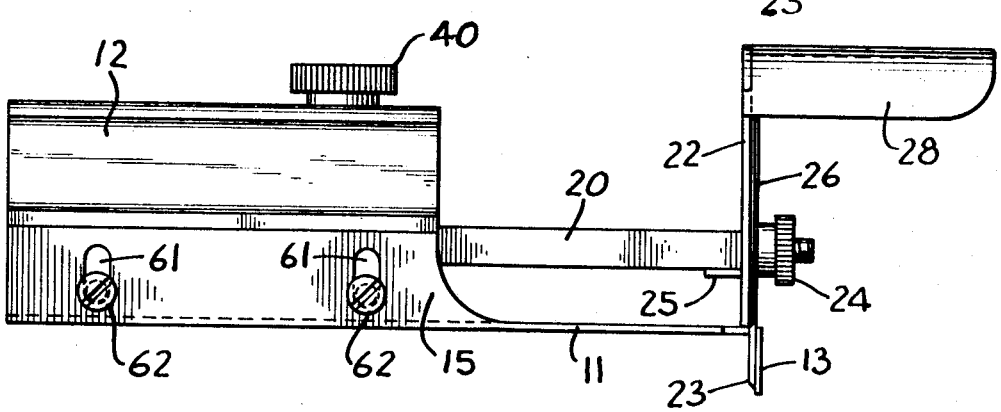
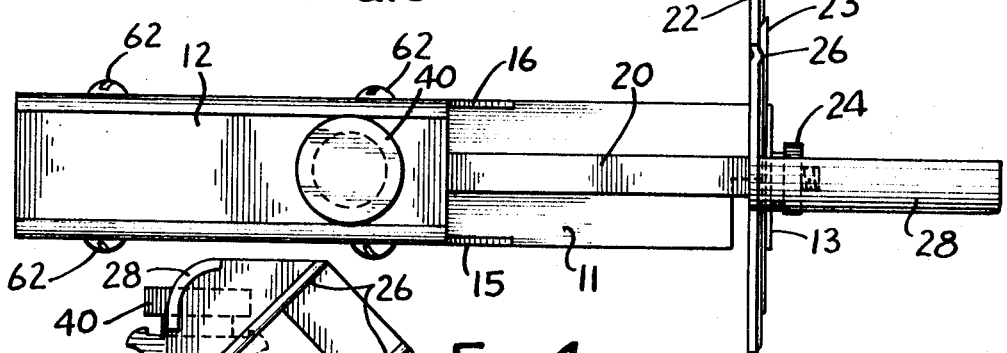
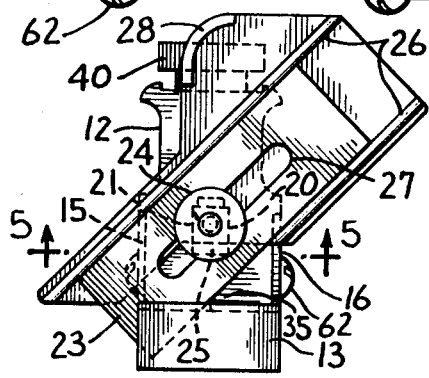

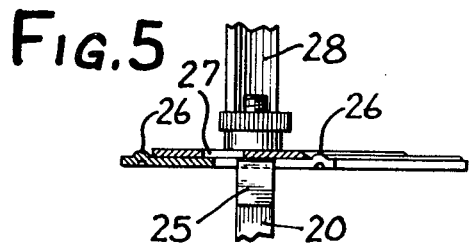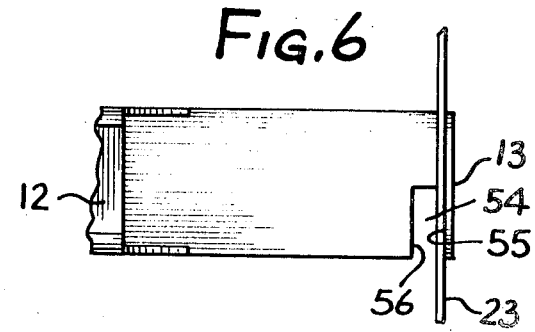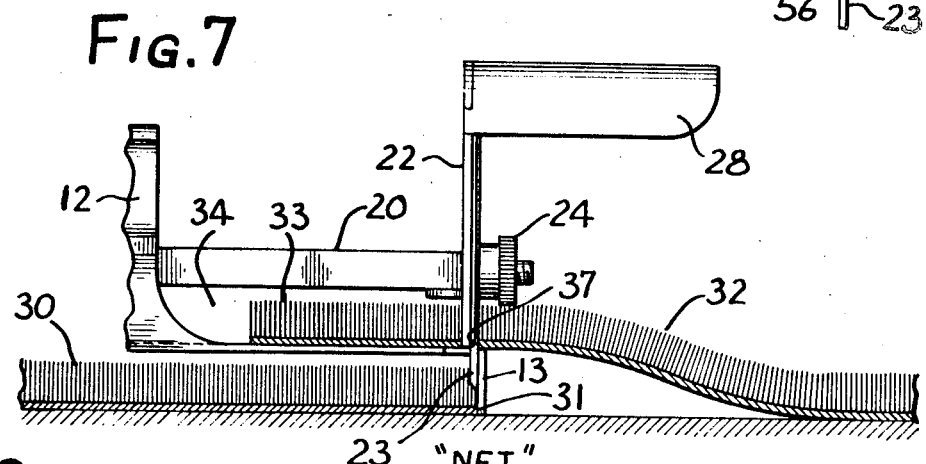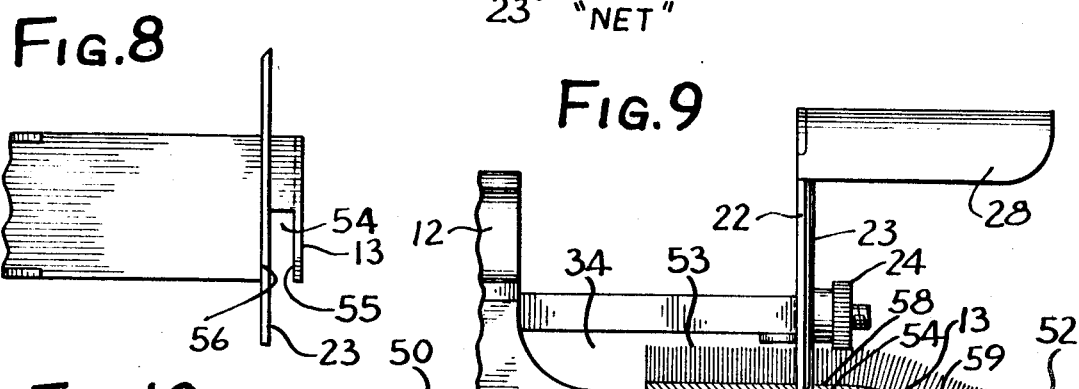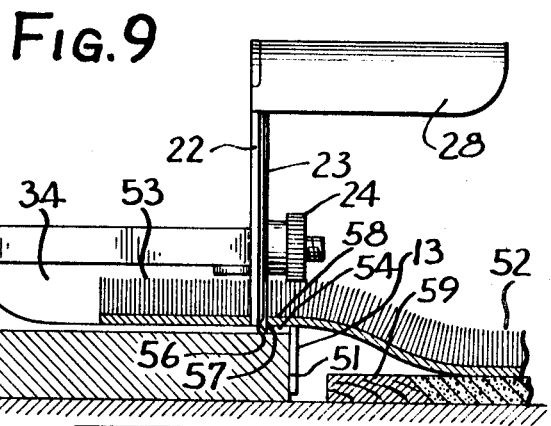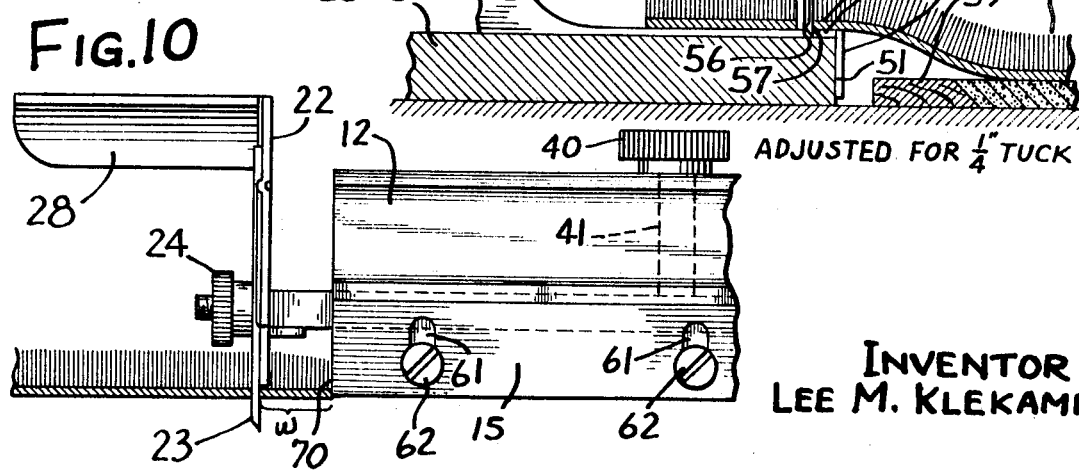

3,514,855
TRIMMER FOR TRIMMING CARPETING TO A REFERENCE EDGE
Lee M. Klekamp, Chicago, Ill., assignor to Kinkead Industries, Incorporated, Chicago, Ill., a corporation of Illinois
Filed Dec. 26, 1967, Ser. No. 693,547
Int. Cl. B26b 29/00
U.S. Cl. 30—293
6 Claims

ABSTRACT OF THE DISCLOSURE

A trimming tool for installation of carpeting which permits a second piece of carpeting, overlapping a first piece, to be trimmed off accurately, edge-to-edge with the first piece, prior to joining them together. The tool is capable of adjustment for use for related purposes as, for example, the trimming of carpeting for tucking behind a tack strip adjacent tiling or the like and for the trimming of selvage.

---

It is an object of the present invention to provide a trimming tool which enables accurate trimming of one piece of carpeting with respect to another prior to taping or sewing the pieces together to form a neat and accurate seam. It is a related object to provide a carpet trimming tool which permits a piece of overlapping carpet to be cut to an accurate reference edge even though such reference edge is hidden by the overlap. In this connection it is tn object to provide a trimming tool which may be used with assurance and which achieves inherently accurate results even in the hands of an installer who is unskilled or has limited experience. Indeed, use of the present tool makes it possible to fit carpeting accurately, edge-to-edge under circumstances normally involving risk of spoiling the entire job and where it has been necessary in the past to exercise the highest degree of skill and judgment.

It is another object of the present invention to provide a trimming tool which is simple and the operation of which is easily understood without instruction or practice, and which, moreover, is highly versatile being capable of use for a number of different jobs considered troublesome in the past. In this connection it is an object to provide a trimming tool for carpet installation which may be easily adjusted for the various uses to which the tool is to be put but in which setting of the adjustments does not require any particular skill and in which the tool, even though misadjusted or misused, is largely incapable of spoiling a piece of expensive carpeting.

It is a more detailed object to provide a tirmming tool of the above type which is inherently simple and inexpensive, which is safe to use, and which may be employed with all types of carpeting having a wide range of thickness, excepting only that having special rubber backing.

It is yet another object to provide a trimming pool which is useful in fitting free-form carpeting and in the patching of damaged areas of carpeting previously installed.

Other objects and advantages of the invention will become apparent upon reading the attached detailed description and upon reference to the drawings in which:

FIG. 1 is a perspective view of a tool constructed in accordance with the present invention;

FIG. 2 is an elevational view of the tool shown in FIG. 1;

FIG. 3 is a top view of the tool shown in FIG. 1;

FIG. 4 is a right-hand end view, somewhat enlarged, of the tool shown in FIG. 1;

FIG. 5 is a fragmentary section looking along the line 5—5 in FIG. 4;

FIG. 6 is a fragmentary view showing adjustment of the blade for "net" trimming of carpeting for seaming purposes;

FIG. 7 is a fragmentary elevation showing the trimming of carpet with the blade adjusted as in FIG. 6.

FIG. 8 is a view similar to FIG. 5 but showing the blade adjusted to its offset position to enable tucking of the trimmed edge;

FIG. 9 is a fragmentary elevation showing the trimming of carpeting with the blade adjusted as in FIG. 8;

FIG. 10 is a fragmentary view of the tool showing the blade holder and supporting bar reversed for trimming of selvage.

While the invention has been described in connection with a preferred embodiment, it will be understood that I do not intend to be limited to the particular embodiment shown but, on the contrary, intend to cover the various alternative and equivalent constructions included within the spirit and scope of the appended claims.

Turning now to the drawings, the trimming tool has a base plate 11 which is preferably formed of a flat piece of metal mounting a body 12 at its left-hand end and having a downwardly turned lip at its right-hand end forming an edge guide 13, the latter being used to guide the tool along a reference edge as will be described. The body 12, which is of generally rectangular shape, is preferably formed as an aluminum extension. For securing the body to the base plate, the base plate has upwardly turned edges 15, 16 to form a trough in which the body is snugly seated.

In accordance with the invention an elongated supporting member or bar is provided mounted in the body 12, spaced from the base plate, and carrying a downwardly projecting blade at its end substantially alined with the edge guide and capable of cutting the overlapping edge of a piece of carpet accommodated in the space or throat below the supporting bar. Thus in the present instance I provide a supporting bar 20, one end of which is telescoped into an opening 21 formed in the body 12. At its outer or opposite end the supporting bar 20 carries a blade holder 22 in the form of a flat plate of metal mounting a blade 23. with the holder and blade both being clamped to the bar by means of a clamping nut 24 which engages the threaded tip of the bar. To prevent relative rotation of the blade holder with respect to the bar, the bar is preferably of square cross section and the blade holder is provided with an inwardly turned tab 25 which engages the flat underside of the bar. For nesting the blade in the blade holder, the blade holder is deformed to provide a shallow groove defined by a pair of spaced ridges as indicated at 26 (see FIGS. 4 and 5). The blade may be adjusted upwardly and downwardly within the confines of the ridges by reason of the elongated slot 27 which is formed in the blade.

For the purpose of applying cutting force right at the blade position, the blade holder is preferably provided with a horizontally extending handle 28 which is in the form of a curved plate of metal secured by welding or the like to the upper edge of the blade holder.

In normal usage the blade is clamped in a position in which the lower end of the blade overlaps and lies flatly against the side of the edge guide 13. In this position the blade is in what is termed a "net" cutting position in which the resulting trimmed edge of the carpet abuts the reference edge of the carpet which is already in place so that the two edges precisely coincide for sewing or taping to produce a neat and well fitted seam.

The manner in which the tool is employed to produce a fitted butt joint between two adjacent pieces of carpet will be apparent upon inspection of FIG. 7. Here the first piece of carpet, laid in place, is indicated at 30 presenting an edge 31 which is engaged by the edge guide 13. Overlapping the first piece of carpet is a second piece 32 which is also in place having an overlapping portion 33 which is accommodated in the throat 34 below the supporting bar. In use the body of the trimming tool, and the handle 28, are grasped by the hand, or fingertips, of the installer and the tool is drawn along the direction of the arrows in FIG. 1, maintaining the edge guide 13 in contact with the reference edge 31. The upper piece of carpet moves into the nip 35 of the blade where it is severed to produce a trimmed edge 37 which is alined with the edge 31. Thus when the tool is removed at the end of the cutting stroke, the carpet 32 is free to drop, or to be pressed, into contact with the floor, following which the edges 31, 36 may be sewn together to provide a neat and unobtrusive joint. With certain types of carpeting, the sewing may be dispensed with and a layer of adhesive tape may be used under the mating edges to connect them invisibly together.

In accordance with one of the aspects of the invention, means are provided for moving the supporting bar relative to the base plate so that the blade is offset inwardly from the reference edge by a small distance on the order of ¼" to provide material for tucking behind a tackless strip or the like. Such adjustment is brought about in the present instance by making the bar 20 slidable in the opening 21 and by providing a clamping screw 40 having a threaded shank 41 which is screwed into the body 12. The alternate mode of operation of the trimming tool is set forth in FIGS. 8 and 9. Here it will be assumed that instead of cutting the carpeting "net" to form a seam it is desired to trim the material to fit a tilted surface 50 having a reference edge 51. The carpet, indicated at 52, has an overlapping portion 53 which extends into the throat 34. Prior to use the clamping screw 40 is loosened and the supporting bar 20 is moved inwardly approximately a quarter of an inch. To define the limits of adjustment and to provide lateral support for the blade, the base plate preferably has an opening or relief in the form of a notch 54 having a first side 55 against which the blade is seated for use of the tool for seaming and a second side 56 which is engaged by the blade in offset position when tucking is desired. Assuming that the blade is in its offset position, clamping against the edge 56, the tool is inserted in its operating position shown in FIG. 9 and drawn along the line of cut as previously described. This severs the carpet at a trimmed edge 57 resulting in a narrow margin 58 which may be neatly tucked in the space normally provided behind the anchoring strip 59 which may be either of the tack or "tackless" type.

It may be noted that in both of the modes of use shown in FIGS. 7 and 9 the overlapping edge of the carpet in place is accurately trimmed with respect to a reference edge which is hidden under the overlap. By simply observing the precaution of keeping the edge guide 13 in contact with the reference edge, which can be readily done by applying a constant sideways-directed force to the tool as it is drawn along, accuracy is assured even where the installer has only limited skill or experience. Moreover, since the limits of lateral adjustment of the blade in the notch 54 of the base plate are severely limited, it is not possible for the installer to make a serious mistake even if the blade has been inadvertently misadjusted. Thus where the blade is clamped in its offset position for a seaming job, all that is required is to reset the blade to remove the additional ¼" of material when the error is noted. Even where the blade is accidentally set in its "net" position for a job requiring "tuck," the tucking stock may be obtained by use of the kicker. Also if the guide should slip from the reference edge, the unwanted cut is in the scrap and the cut can be repeated. In short, fitting operations usually calling for the highest degree of skill can be handled, foolproof, by an inexperienced installer.

While the operation of the trimming tool has been described (FIG. 7), with respect to the making of a straight seam, it will be understood that the tool is not limited to the making of a straight seam but is especially well adapted to the fitting of carpeting in free-form sections. Thus where a first piece of carpeting is in place having a free-form edge 31, a second piece 32 is laid with overlap 33, the latter approximately following the contour of the edge 31. The tool is then moved along the edge 31, just as previously described, but taking care to maintain the tool approximately at right angles to the edge. It will be found, upon completion, that the trimmed edge 37 accurately matches the edge 31 for convenient seaming, no matter how complex the free-formed edge may be. Thus intricate designs may be achieved having a high degree of artistry and normally calling for consummate skill. The same technique may be employed when replacing a damaged section of carpeting. The damaged section may be cut out and a replacement section, or patch, may be cut to the approximate shape of the opening but with a convenient amount of overlap. With the replacement section lightly tacked in place, the tool may be guided along the reference edge to produce a perfectly fitting patch which may, particularly in the case of high nap carpeting be practically invisible.

In order to accommodate the cutting tool to high nap carpeting material, means may be provided for adusting the spacing between the supporting bar 20 and the base plate. This may easily be done by forming slots 61 in the edges 15, 16 of the base plate engageable by clamping screws 62. It will be apparent that the amount of vertical movement is limited only by the slot length. If desired the body 12 and supporting bar 20 may be angled slightly with respect to the base plate without reducing the effectiveness of the tool.

It is one of the more detailed features of the present invention that the opening 21 which receives the supporting bar 20 extends all of the way through the body 12 thereby permitting the supporting bar, and the blade assembly which is mounted at the end thereof, to be reversed for the trimming of selvage as shown in FIG. 10. Preferably the left-hand end of the body 12 is made flat and coextensive with the upwardly turned edges 15, 16 on the base plate as indicated at 70 to provide a smooth reference surface for abutting the edge of the carpet which is to be trimmed. If it is desired to trim, say, ½" from the selvage of a carpet, the clamping screw 40 may be clamped with the cutting width W equal to ½". The fingertips of the user, grasping the body of the tool and the handle 28, apply pressure to move the tool along the cut with a lateral force component to maintain the edge of the carpet seated on the reference surface 70.

The tool described above not only enables formerly difficult work to be done quickly and easily, but the tool is also safe to use, with the blade being protectively recessed within the holder and with the nip 35 of the blade being in a non-exposed position. If the user wishes, the blade may be retracted so that its tip is fully recessed when the device is in the tool bag.

The tool is, moreover, inherently strong and long-lived yet susceptible to being manufactured simply and inexpensively using easily formed parts. It will be apparent that the parts of the device may, if desired, be shaped somewhat differently than shown and that other suitable materials may be employed for certain parts of the device, for example, the body may be formed of plastic, without departing from the invention.

I claim:

1. In a trimming tool for use by a carpet installer for in-place trimming of a piece of carpet having an edge portion overlapping a reference edge, the combination comprising a flat horizontal base member having a body at one end and a downwardly turned edge guide at the other, the edge of the base member having a notch extending horizontally inward adjacent the edge guide, a horizontal supporting bar mounted on the body and overlying the base member to define a horizontal throat for reception of the overlapping edge portion of the carpet, a downwardly extending blade holder rigidly secured to the outer end of the bar and having a downwardly extending blade terminating in the notch adjacent the edge guide, and a handle mounted on the blade holder in a position overlying the blade for facilitating movement of the tool with the edge guide riding along the reference edge so that the blade severs the overlapping edge portion for lifting of the resulting trimmed edge to the reference edge.

2. In a trimming tool for use by a carpet installer for in-place trimming of a piece of carpet having an edge portion overlapping a reference edge, the combination comprising a flat horizontal base member having a body at one end and a downwardly turned edge guide at the other, a horizontal bar mounted on the body and adjustable endwise parallel to the base member to define a horizontal throat for reception of the overlapping edge portion of the carpet when the edge guide is in contact with the reference edge, a flat blade holder at the end of the bar, said base portion having a notch with generally parallel edges and on the order of one quarter inch in width extending horizontally inward adjacent the edge guide, means for clamping the blade in said blade holder in a downwardly extending angled position so that the lower end of the blade overlaps the edge guide and registers in said notch adjacent one of the edges thereof so that when the tool is drawn along the reference edge the blade severs the overlapping edge portion for fitting of the resulting trimmed edge with respect to the reference edge.

3. In a trimming tool for use by a carpet installer for in-place trimming of a piece of carpet having an edge portion overlapping a reference edge, the combination comprising a flat horizontal base member having an upstanding body of rectangular configuration at one end and a downwardly turned edge guide at the other, a horizontal supporting bar telescoped in said body and overlying the base member to define a horizontal throat for reception of the overlapping edge portion of the carpet when the edge guide is in contact with the reference edge, a clamping screw in the body, a vertical blade supporting plate at the end of the supporting bar having a clamp for holding a blade in a downwardly angled position, said base member having a horizontal notch formed therein, one edge of which is defined by the edge guide and the opposite edge of which is spaced inwardly therefrom along the direction of the bar, said body having a clamping screw for clamping the supporting bar to permit location of the blade at the edge guide for edge-to-edge fitting of two adjacent pieces of carpet and for locating the blade at said opposite edge to provide a narrow margin for tucking of the trimmed edge with respect to the reference edge.

4. In a trimming tool for use by a carpet installer for in-place trimming of a piece of carpet having an edge portion overalapping a reference edge, the combination comprising a flat horizontal base plate formed into trough shape at one end and having its opposite end bent downwardly to provide an edge guide, a body member of rectangular shape mounted in said trough and having means for clamping the same therein at an adjustable height, a horizontal supporting bar telescoped into the body member, a blade holder clamped to the end of the supporting bar having means for holding a blade in a downwardly angled position and having a handle secured thereto, said base member having a notch formed in the edge thereof immediately adjacent the edge guide for receiving the lower end of the blade, and means on said body for clamping the supporting bar therein with the blade in a horizontally adjusted position in the notch.

5. In a trimming tool for use by a carpet installer for in-place trimming of a piece of carpet having an edge portion overlapping a reference edge, the combination comprising a flat horizontal base plate having an upstanding body portion at one end and a downwardly projecting edge guide at the other, a horizontal supporting bar telescoped in the body portion and spaced above the base plate to define a throat for receiving the overlapping edge portion of the carpet when the edge guide is positioned for drawing along the reference edge, a blade holder at the outer end of the supporting bar and extending downwardly therefrom for positioning of the blade adjacent the reference edge for severing the overlapping edge portion of the carpet, said supporting bar being reversibly engageable with the body portion so that the supporting bar and is associated blade may be reversely inserted into said body portion and clamped in cutting position for trimming of the selvage portion of the carpet.

6. The combination as claimed in claim 1 in which clamping means are interposed between the base member and the body for clamping the body at an adjustable height with respect to the base member thereby to accommodate carpet having a different thickness of nap.

References Cited

UNITED STATES PATENTS

| | | | |
|---|---|---|---|
| 2,557,699 | 6/1951 | Silver | 30—293 X |
| 2,601,183 | 6/1952 | Unsinger | 30—293 |
| 3,079,688 | 3/1963 | Ryan | 30—294 |
| 3,407,498 | 10/1968 | Young | 30—293 |

LESTER M. SWINGLE, Primary Examiner

J. C. PETERS. Assistant Examiner